Feb. 20, 1962    J. PICKLES    3,022,035
SEAT SUPPORTING AND ADJUSTING MECHANISM
Filed Nov. 2, 1959    3 Sheets-Sheet 1

INVENTOR.
JOSEPH PICKLES
BY Whittemore
Hulbert & Belknap
ATTORNEYS

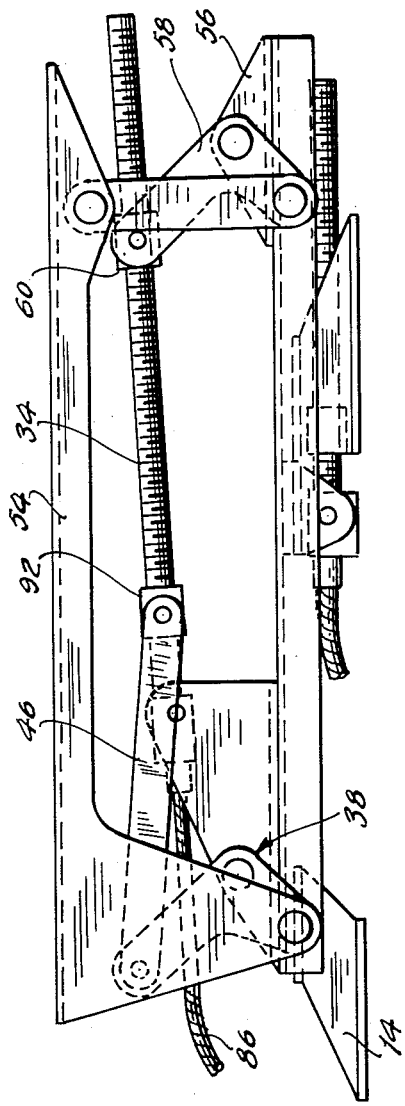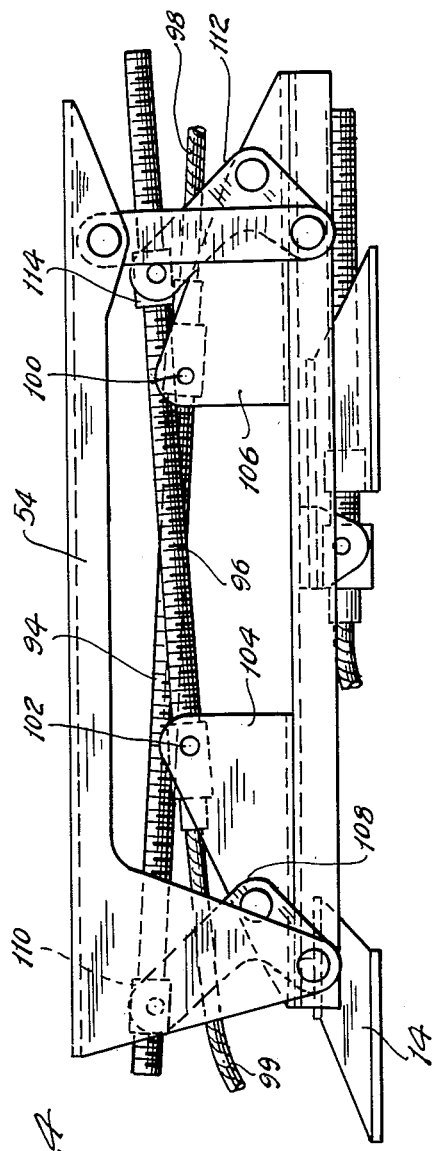

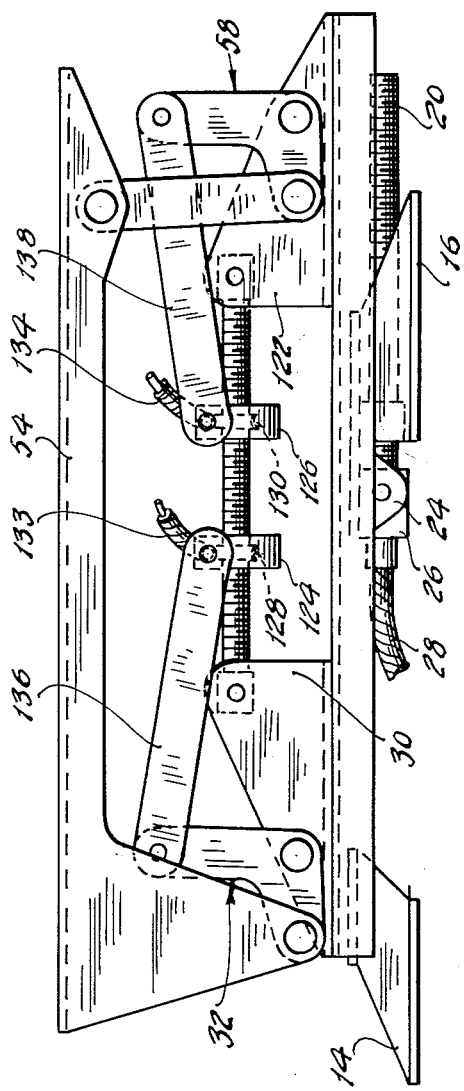

though restrained against endwise movement, is rotated and this of course rotates the screw shaft 34 which, since the nut 66 is held against rotation, causes the nut 66 to move longitudinally of the screw shaft 34. This elevates the rear end of the seat support bar 54 through the lift arm 68, the lift link 72 and the pivot 74. At this time the front end of the seat support bar 54 is held against vertical movement since the nut 80 is restrained and hence the screw shaft 34 does not have any endwise movement, nor of course does the link 46 which is connected to the nut.

United States Patent Office 3,022,035
Patented Feb. 20, 1962

3,022,035
SEAT SUPPORTING AND ADJUSTING MECHANISM
Joseph Pickles, Dearborn, Mich., assignor to Ferro Stamping Company, Detroit, Mich., a corporation of Michigan
Filed Nov. 2, 1959, Ser. No. 850,397
13 Claims. (Cl. 248—395)

The present invention relates to a seat supporting and adjusting mechanism, and more particularly, a mechanism designed for power actuation.

In accordance with the present invention adjustable seat support mechanism is provided particularly for vehicle seats, which is capable of effecting the so-called six-way actuation; namely, a fore and aft adjustment, a vertical adjustment, and a tilting adjustment. The mechanism for effecting adjustment includes screw shaft and nut combinations particularly arranged in order to reduce the number of parts required, to simplify operation, and to provide an extremely efficient construction.

The mechanism is adapted to be operated from a single reversible electric motor, preferably through the medium of flexible transmission or drive shafts adapted to couple together adjusting mechanism at opposite ends of the vehicle seat.

It is an object of the present invention to provide adjustable seat mechanism including a pair of bell cranks, and means for selectively moving said bell cranks in unison or independently to effect vertical and tilting movement of the seat.

It is a further object of the present invention to provide power adjustment mechanism for a vehicle seat including relatively rotatable nut and screw shaft combinations including means for effecting direct driving rotation of both the screw shaft and the nut either independently or in unison to obtain a desired operation of the seat adjusting mechanism.

Other objects and features of the invention will become apparent as the description proceeds, especially when taken in conjunction with the accompanying drawing, illustrating preferred embodiments of the invention, wherein:

FIGURES 2, 3 and 4 are similar views showing different arrangements of the operating components.

FIGURE 5 is a view similar to FIGURE 1 showing a fixed screw element.

Figure 1:
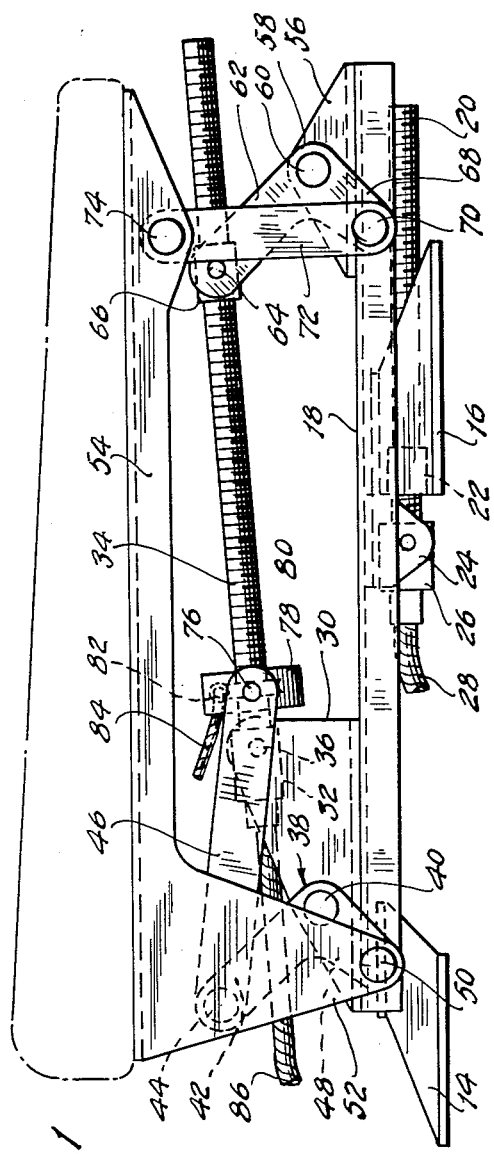
FIGURE 1 is a side elevational view of the operating components of the seat adjusting mechanism.

Referring first to FIGURE 1, there is shown the operating mechanism adapted to be positioned between the floor 10 of a motor vehicle and a seat frame, a portion of which is indicated at 12. It will be appreciated that identical or substantially similar adjustable seat support devices are provided at opposite ends of the vehicle seat and that these devices are operated in unison.

In general terms, power is supplied to the seat adjusting mechanism from a reversible electric motor which is preferably located beneath the seat. The electric motor may be provided with a plurality, such as three, flexible drive shafts or cables extending to each of the seat adjusting mechanisms. These drive shafts are arranged in pairs so that identical adjustments may be imparted simultaneously to the seat adjusting mechanism at opposite ends of the seat.

Alternatively, the motor may be located substantially directly adjacent one of the seat adjusting mechanisms and be connected thereto by rigid drive means such as shafts, and flexible drive shafts or cables provided between the motor and the remote seat adjusting mechanism.

As best seen in FIGURE 1, each of the seat supporting and adjusting mechanisms comprises a pair of slide supports 14 and 16 adapted to be fixedly secured to the floor and to support a rail 18 for longitudinal movement. Suitable bearings (not shown) will normally be provided between the slide supports 14, 16 and the rail 18.

Power means are provided effective to shift the rail 18 longitudinally when energized and operative when de-energized to maintain the rail 18 in its instantaneous position of adjustment. This means for effecting fore and aft adjustment of the seat is herein illustrated as comprising a screw shaft 20 provided with a thread such as an Acme screw thread, and in threaded engagement with a nut 22 fixedly mounted on one of the supports and herein illustrated as the support 16. The slidable rail 18 has depending ears 24 which carry a bearing 26 adapted to mount the screw shaft for free rotation while preventing endwise movement thereof relative to the ears 24. A flexible drive cable 28 is connected to the end of the screw shaft 20. Rotation of the flexible drive cable 28 rotates the screw shaft which is thus moved longitudinally relative to the fixed nut 22, carrying the rail 18 and all structure supported thereby in a fore and aft direction relative to the vehicle.

While the connection of the flexible drive shaft 28 is illustrated herein, as to the screw shaft 20, it will of course be appreciated that instead the screw shaft could be held against rotation and rotation imparted to the nut 22 to effect a like fore and aft adjustment of the seat.

At the front end of the rail 18 there is an upwardly extending post construction 30 and to the post construction 30 there is mounted a pivot bearing 32 adapted to mount a screw shaft 34 for rotation while preventing endwise movement thereof relative to the bearing. The bearing is pivoted to the post construction as indicated at 36. Also pivoted to the post construction 30 is a bell crank indicated generally at 38, its pivot mounting being indicated at 40. The bell crank comprises an actuating arm 42 which is pivoted as indicated at 44 to a rigid link 46 and a lift arm 48 which is pivotally connected as indicated at 50 to a depending front leg 52 of a seat support bar 54. The rail 18 adjacent its rear end is provided with a post construction 56 carrying a bell crank 58 which is pivoted to the post construction 56 as indicated at 60. The bell crank 58 includes an actuating arm 62 pivotally connected at 64 to a nut 66. The bell crank also includes a lift arm 68 pivoted at 70 to a lift link 72 which in turn is pivoted at 74 to the rear end of the seat support bar 54. The link 72 accommodates independent elevation of the front and rear edges of the seat without binding.

The link 46 is pivoted at 76 to a housing 78 carrying a nut 80 threaded to the screw shaft 34. The nut 80 is provided at its periphery with gear teeth which may correspond to the teeth of a worm gear or which may have a substantially greater angle so as to provide reversibility. In any case, rotation is imparted to the nut by means of a mating gear indicated at 82 and connected directly to a flexible drive cable, a portion of which is diagrammatically indicated at 84.

A third flexible drive cable 86 is provided which is directly connected to one end of the screw shaft 34.

With the foregoing construction it will be apparent that a rather unique control of the position of the seat both as to its vertical adjustment and as to its tilted position may be accomplished with only the two bell cranks, the single screw shaft 34, and the nuts 66 and 80.

When the flexible drive shaft 84 is idle the nut 80 is restrained against rotation, although it may be driven in rotation under heavy load if vertical movement of the front end of the seat is blocked. At this time, if rotation is imparted to the flexible drive shaft 86 the nut 80 and housing 78 are caused to move axially of the screw shaft 34 depending upon the direction of rotation of the screw shaft. This will of course effect rocking of the bell crank 38 with corresponding vertical up or down movement of the front end of the seat. At the same time, rotation of the screw shaft results in travel of the nut 66 axially of the shaft with corresponding rocking of the bell crank 58 and vertical up or down movement of the rear end of the seat support bar 54. Thus, connection of the motor by suitable clutch means to the shaft 86 results in substantially vertical adjustment of the seat.

To obtain a desired tilting of the seat the motor may be connected to the flexible drive shaft 84 which will rotate the nut 80 so as to cause the housing 78 to move axially of the screw shaft. This will, through the link 46, result in rocking of the bell crank 38 and vertical up or down movement of the front end of the seat support bar 54. At this time the rear end of the seat support bar 54 remains substantially stationary because the bell crank 58 is not actuated. The tilting adjustment is therefore obtained in this instance by vertical movement of the front end of the seat support bar. However, the same construction also permits independent vertical movement of the rear end of the seat support bar. This is accomplished by simultaneous operation of the drive cables 84 and 86. The rotation of the drive cable 86 of course results in rotation of the screw shaft 34, which through the nut 66, operates the bell crank 58 to effect vertical movement of the rear end of the seat support bar. However, the energization of the flexible drive shaft 84 in this case will be such as to drive the nut 80 in the same direction as the screw shaft 34. Thus, the housing 78 will remain stationary and no movement will be imparted to the front bell crank 38.

Figure 2:
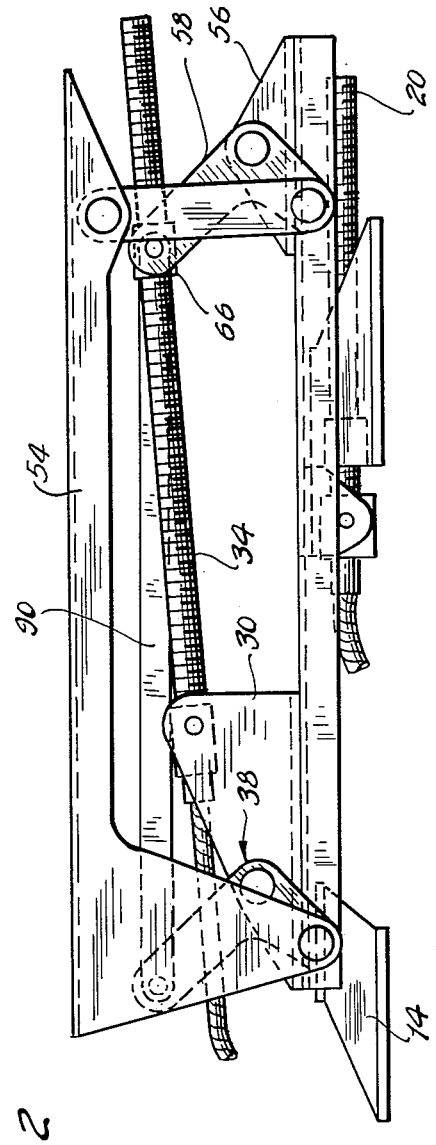

Referring now to FIGURE 2 there is shown a similar arrangement in which like reference characters are applied to like parts. In this case however, a link 90 is provided which connects the bell cranks 38 and 58 so that no tilting adjustment is possible. Vertical movement in this case is accomplished by rotation of the screw shaft 34 which cooperates solely with the nut 66 pivoted to the bell crank 58.

Referring now to FIGURE 3 there is shown a similar arrangement except that the nut 92 carried by the screw shaft 34 is not provided with means for independent rotation. The flexible drive shaft 86 therefore effects vertical movement of the seat by its coaction with the nut 92 connected by the link 46 to the front bell crank 38 and by its cooperation with the nut 60 which is pivoted to the rear bell crank 58.

Referring now to FIGURE 4 there is illustrated a somewhat different construction. In this case a pair of screw shafts 94 and 96 are provided each connected separately to flexible drive shafts 98 and 99 respectively. The shafts 94 and 96 are supported in pivoted bearings 100 and 102 respectively mounted on posts 104 and 106 respectively. The front bell crank in this instance is indicated at 108 which is provided with a pivoted nut 110 threaded to the shaft 94. The rear bell crank 112 is provided with a pivoted nut 114 threaded to the shaft 96. Vertical adjustment of the seat support bar 54 in this case is accomplished by energizing or driving both of the flexible drive shafts 98 and 99. Independent vertical adjustment of the front and rear ends of the seat support bar 54 is of course accomplished by separately energizing the flexible drive shafts 98 and 99.

Referring now to FIGURE 5, a screw element indicated at 120 is fixed at opposite ends to the post 30 and to a similar stationary post 122 fixed on the slide 18. In this case a pair of nut housings 124 and 126 are provided which contain rotatable nuts 128 and 130 adapted to be rotated by suitable means such as worms driven by flexible drive shafts 132 and 134 engaging worm gear teeth provided at the periphery of the nut elements.

The nut housings 124 and 126 are connected by links 136 and 138 respectively to the bell cranks 32 and 58. Obviously, actuation of the nut 128 will effect vertical movement of the front end of the seat support bar 54 without vertical movement of the rear end of the bar, while actuation of the nut 130 will result in vertical movement of the rear end of the seat support bar without substantially affecting the position of the front end of the bar. Thus, the bar may be tilted forwardly or rearwardly, or moved vertically by actuation of both of the nut elements.

The drawings and the foregoing specification constitute a description of the improved seat supporting and adjusting mechanism in such full, clear, concise and exact terms as to enable any person skilled in the art to practice the invention, the scope of which is indicated by the appended claims.

What I claim as my invention is:

1. In a power seat adjuster, a rail, a seat support bar, lever means connecting opposite ends of said seat support bar to said rail, drive means for said lever means comprising a screw shaft, a first nut on said shaft connected to the lever means at one end of said rail and bar, a second nut on said shaft connected to the lever means at the other end of said rail and bar, and power means for independently selectively rotating said screw shaft and first nut.

2. In an adjustable vehicle seat, adjustable seat support mechanisms at opposite ends of the seat, each of said support mechanisms comprising a pair of support members fixed against vertical movement, a seat support bar located above said support members, a lever pivoted to each of said support members, one of said levers being pivotally connected directly to said bar, a link pivotally connected at opposite ends to the other of said levers and said bar, and independently rotatable screw shaft and nut members connected between one of said support members and said levers.

3. In an adjustable vehicle seat, adjustable seat support mechanisms at opposite ends of the seat, each of said mechanisms comprising a pair of support members fixed against vertical movement, a seat support bar located above said support members, a bell crank comprising a lift arm and an actuating arm pivoted to each of said support members, the outer end of the lift arm of one of said bell cranks being pivotally connected directly to one end of said bar, means pivotally connecting the outer end of the lift arm of said other bell crank to the other end of said bar, a rotatable screw shaft extending generally longitudinally of said bar and fixed against endwise displacement, a pair of nuts on said shaft, means connecting said nuts respectively to the actuating arms of said bell cranks, and power means for selectively driving said shaft in rotation.

4. In an adjustable vehicle seat, adjustable seat support mechanisms at opposite ends of the seat, each of said mechanisms comprising a pair of support members fixed against vertical movement, a seat support bar located above said support members, a bell crank comprising a lift arm and an actuating arm pivoted to each of said support members, the outer end of the lift arm of one of said bell cranks being pivotally connected directly to one end of said bar, means pivotally connecting the outer end of the lift arm of said other bell crank to the other end of said bar, a rotatable screw shaft extending generally longitudinally of said bar and fixed against endwise displacement, a pair of nuts on said shaft, means connecting said nuts respectively to the actuating arms of said bell cranks, and power means for separately driving said shaft and one of said nuts in independent rotation.

5. In an adjustable vehicle seat, adjustable seat support mechanisms at opposite ends of the seat, each of said mechanisms comprising a pair of support members fixed against vertical movement, a seat support bar located above said support members, a bell crank comprising a lift arm and an actuating arm pivoted to each of said support members, the outer end of the lift arm of one of said bell cranks being pivotally connected directly to one end of said bar, means pivotally connecting the outer end of the lift arm of said other bell crank to the other end of said bar, a rotatable screw shaft extending generally longitudinally of said bar and fixed against endwise displacement, a pair of nuts on said shaft, a housing in which one of said nuts is rotatable, a link connecting said housing to the actuating arm of one of said bell cranks, the other of said nuts being non-rotatively and pivotally connected to the actuating arm of said other bell crank.

6. In an adjustable vehicle seat, adjustable seat support mechanisms at opposite ends of the seat, each of said mechanisms comprising a pair of support members fixed against vertical movement, a seat support bar located above said support members, a bell crank comprising a lift arm and an actuating arm pivoted to each of said support members, the outer end of the lift arm of one of said bell cranks being pivotally connected directly to one end of said bar, means pivotally connecting the outer end of the lift arm of said other bell crank to the other end of said bar, a rotatable screw shaft extending generally longitudinally of said bar and fixed against endwise displacement, a pair of nuts on said shaft, a housing in which one of said nuts is rotatable, a link connecting said housing to the actuating arm of one of said bell cranks, the other of said nuts being non-rotatively and pivotally connected to the actuating arm of said other bell crank, first drive means connected to said shaft, second mechanical drive means permanently engaged with said one nut, and operator controlled means for actuating either of said drive means independently of the other and both of said drive means together.

7. Apparatus as defined in claim 6 in which the drive means to at least one of said mechanisms comprises flexible drive cables.

8. Apparatus as defined in claim 5 which comprises a longitudinally movable bar on which said support members are mounted to provide for fore and aft adjustment of the seat.

9. In a power seat adjuster, a rail, a seat support bar, lever means connecting opposite ends of said seat support bar to said rail, drive means for said lever means comprising a screw shaft member, means mounting said screw shaft member in fixed position relative to said rail, a pair of nut members threaded to said screw shaft member, selectively operable drive means for rotating said nut members to effect independent movement thereof longitudinally of said screw shaft member, and a link connecting each of said nut members to one of said levers.

10. In an adjustable vehicle seat, adjustable seat support mechanisms at opposite ends of the seat, each of said mechanisms comprising a pair of support members fixed against vertical movement, a seat support bar located above said support members, a bell crank comprising a lift arm and an actuating arm pivoted to each of said support members, the outer end of the lift arm of one of said bell cranks being pivotally connected directly to one end of said bar, means pivotally connecting the outer end of the lift arm of said other bell crank to the other end of said bar, a rotatable screw shaft extending generally longitudinally of said bar and fixed against endwise displacement, a pair of nuts on said shaft, means non-rotatably connecting said nuts respectively to the actuating arms of said bell cranks, and power means for selectively driving said shaft in rotation.

11. In an adjustable vehicle seat, adjustable seat support mechanisms at opposite ends of the seat, each of said support mechanisms comprising a pair of support members fixed against vertical movement, a seat support bar located above said support members, a lever pivoted to each of said support members, one of said levers being pivotally connected directly to said bar, a link pivotally connected at opposite ends to the other of said levers and said bar, independently rotatable screw shaft and nut members connected between one of said support members and said levers, and a second pivotally supported link connecting said levers.

12. In an adjustable vehicle seat, adjustable seat support mechanisms at opposite ends of the seat, each of said support mechanisms comprising a pair of support members fixed against vertical movement, a seat support bar located above said support members, a lever pivoted to each of said support members, one of said levers being pivotally connected directly to said bar, a link pivotally connected at opposite ends to the other of said levers and said bar, an independently rotatable screw shaft and nut member connected between the support member said one lever is pivoted to and said other lever and a second independently rotatable screw shaft and nut member connected between the support member said other lever is pivoted to and said one lever.

13. In an adjustable vehicle seat, adjustable seat support mechanisms at opposite ends of the seat, each of said support mechanisms comprising a support member fixed against vertical movement, a seat support bar located above said support member, a pair of levers pivoted to said support member in spaced relation to each other, one of said levers being pivotally connected directly to said bar, a link pivotally connected at opposite ends to the other of said levers and said bar, and selectively relatively rotatable screw shaft and nut members connected between said support and lever members.

References Cited in the file of this patent

UNITED STATES PATENTS 2,809,688     Brundage _____ Oct. 15, 1957